United States Patent [19]

Sanders, Jr. et al.

[11] Patent Number: 5,034,034

[45] Date of Patent: Jul. 23, 1991

[54] NOVEL ARYL CARBONATE CYANOARYL ETHER GAS SEPARATION MEMBRANES

[75] Inventors: Edgar S. Sanders, Jr., Pittsburg; Theodore L. Parker, Walnut Creek, both of Calif.

[73] Assignee: The Dow Chemical Company, Midland, Mich.

[21] Appl. No.: 574,323

[22] Filed: Aug. 28, 1990

[51] Int. Cl.$^5$ .............................................. B01D 53/22
[52] U.S. Cl. ................. 55/158; 210/500.23; 210/500.28
[58] Field of Search ............. 55/158; 210/500.23, 210/500.28

[56] References Cited

U.S. PATENT DOCUMENTS

| | | | |
|---|---|---|---|
| 3,419,526 | 12/1968 | Schnell et al. | 260/49 |
| 4,260,719 | 4/1981 | Ching | 528/196 |
| 4,567,248 | 1/1986 | Blinne et al. | 528/211 |
| 4,640,974 | 2/1987 | Matsuo et al. | 528/211 |
| 4,640,975 | 2/1987 | Matsuo et al. | 528/211 |
| 4,663,427 | 5/1987 | Matsuo et al. | 528/211 |
| 4,703,104 | 10/1987 | Matsuo et al. | 528/211 |
| 4,812,507 | 3/1989 | Matsuo et al. | 528/211 |
| 4,972,016 | 11/1990 | Murakami | 524/449 |

*Primary Examiner*—Morton Foelak
*Attorney, Agent, or Firm*—Janet P. Clark

[57] ABSTRACT

The invention relates to novel aryl carbonate cyanoaryl ether gas separation membranes and a method of separating gases using such membranes.

22 Claims, No Drawings

NOVEL ARYL CARBONATE CYANOARYL ETHER GAS SEPARATION MEMBRANES

BACKGROUND OF THE INVENTION

This invention relates to novel semi-permeable aryl carbonate cyanoaryl ether gas separation membranes and a process of separating gases using said membranes.

The use of membranes to separate gases is known in the art. Membranes have been used to recover or isolate a variety of gases, including hydrogen, helium, oxygen, nitrogen, carbon monoxide, carbon dioxide, water vapor, hydrogen sulfide, ammonia, and/or light hydrocarbons. Applications of particular interest include the separation of hydrogen or helium from gas mixtures such as mixtures containing nitrogen, carbon monoxide, carbon dioxide, water vapor, and/or light hydrocarbons. For example, the separation and recycle of hydrogen is often necessary in various hydrocracker, hydrotreater, and catalytic cracking processes used in the oil refinery industry. Other applications of interest include the separation of carbon dioxide from light hydrocarbons or other crude oil components as part of the tertiary oil recovery process. Additional applications include the recovery of an enriched oxygen stream from air for use in enhanced combustion or fermentation processes. Alternately, an enriched nitrogen stream may be obtained from air for use as an inert atmosphere over flammable fluids or for food storage. Membranes can be used to achieve such separations.

Such membrane separations are based on the relative permeability of two or more gaseous components through the membrane. To separate a gas mixture into two portions, one richer and one leaner in at least one gaseous component, the mixture is brought into contact with one side of a semi-permeable membrane through which at least one of the gaseous components selectively permeates. A gaseous component which selectively permeates through the membrane passes through the membrane more rapidly than at least one other gaseous component of the mixture. The gas mixture is thereby separated into a stream which is enriched in the selectively permeating gaseous component or components and a stream which is depleted in the selectively permeating gaseous component or components. A relatively non-permeating gaseous component passes more slowly through the membrane than at least one other gaseous component of the mixture. An appropriate membrane material is chosen so that some degree of separation of the gas mixture can be achieved.

Membranes for gas separation have been fabricated from a wide variety of polymeric materials, including cellulose esters and ethers, aromatic polyimides, polyaramides, polysulfones, polyethersulfones, polyesters, and polycarbonates. An ideal gas separation membrane is characterized by the ability to operate under high temperatures and/or pressures while possessing a high gas separation factor (selectivity) and high gas permeability. Solvent resistance is also preferred: however, gas separation membranes also are preferably fabricated from polymers which are easily processed. The problem is finding membrane materials which possess all the desired characteristics. Polymers possessing high separation factors generally have low gas permeabilities, while those polymers possessing high gas permeabilities generally nave low separation factors. In the past, a choice between a high gas separation factor and a high gas permeability has been unavoidably necessary.

Furthermore, some of the polymeric membrane materials previously used for membranes suffer from the disadvantage of poor performance under high operating temperatures and pressures. However, those polymeric membrane materials capable of operating at high of temperatures and pressures are typically difficult to fabricate into membranes. Solvent resistance is also generally obtainable only with polymeric materials which are difficult to fabricate into membranes. A membrane capable of separating gas mixtures which possesses high selectivity, high, gas permeability, ability to operate under extreme conditions of temperature and pressure, improved solvent resistance, and ease of fabrication is needed.

SUMMARY OF THE INVENTION

The invention is a semi-permeable gas separation membrane comprising a thin discriminating layer of an uncross-linked or cross-linked aryl carbonate cyanoaryl ether copolymer possessing a copolymer backbone structure corresponding to Formula I:

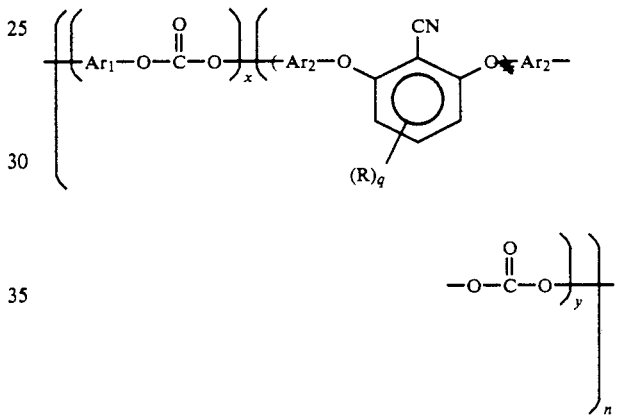

wherein $Ar_1$ and $Ar_2$ are each individually a divalent aromatic residue selected from the group consisting of:

A. an unsubstituted or inertly substituted phenylene, unsubstituted or inertly substituted naphthylene;

B.

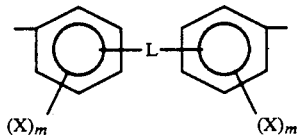

wherein

L is selected from the group consisting of a direct bond, a divalent $C_{1-15}$ hydrocarbyl radical, a divalent $C_{1-8}$ halohydrocarbyl radical, —O—, —CO—, —S—, —SO—, —SO$_2$—, and —SS—, X is individually in each occurrence selected from the group consisting of a hydrogen radical, a monovalent $C_{1-4}$ hydrocarbyl radical, a $C_{1-4}$ halohydrocarbyl radical, and a halogen, and m is an integer between 1 and 4 inclusive; and C. a divalent bisphenyl fluorenyl or spiro indanyl radical;

R is individually in each occurrence selected from the group consisting of a hydrogen radical, a monovalent $C_{1-4}$ hydrocarbyl radical, a $C_{1-4}$ halohydrocarbyl radical, and a halogen, and q is a positive integer between 1 and 3 inclusive:

s is a positive integer between about 1 and about 250 inclusive:

x is a positive integer between about 0 and about 250 inclusive, and y is a positive integer between about 1 and about 500 inclusive, wherein the ratio of $y/(x+y)$ is between about 0.25 and 1 inclusive: and n is a positive integer representing a degree of polymerization which provides a number-average molecular weight of at least about 4,000.

In another aspect, the invention is a process of separating gases comprising:

A. contacting one side of a semi-permeable gas separation membrane with a feed gas mixture under pressure, wherein the membrane divides a separation chamber into a high pressure side into which the feed gas mixture is fed and a low pressure side:

B. maintaining a pressure differential across the membrane under conditions such that at least one gaseous component in the feed gas mixture selectively permeates through the membrane from the high pressure side to the low pressure side of the membrane:

C. removing from the low pressure side of the membrane permeated gas which is enriched in the selectively permeating gaseous component(s); and D. removing from the high pressure side of the membrane non-permeated gas which is depleted in the selectively permeating gaseous component(s);

wherein the membrane comprises a thin discriminating layer of an uncross-linked or cross-linked aryl carbonate cyanoaryl ether copolymer possessing a copolymer backbone structure corresponding to Formula I.

The membranes of this invention possess good gas selectivity and gas permeability, adequate mechanical strength, good temperature and solvent resistance, and are readily fabricated.

DETAILED DESCRIPTION OF THE INVENTION

The gas separation membranes of this invention are fabricated from aryl carbonate cyanoaryl ether copolymers. The aryl carbonate cyanoaryl ether copolymers are random copolymers which contain cyanoaryl ether carbonate segments and optionally aryl carbonate segments. The aryl carbonate cyanoaryl ether copolymers preferably possess a copolymer backbone structure corresponding to Formula I:

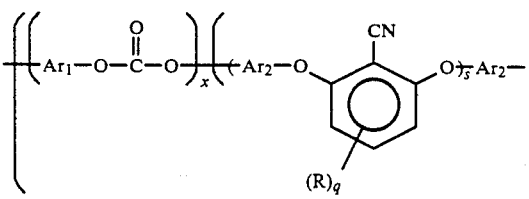

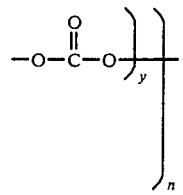

wherein $Ar_1$ and $Ar_2$ are each individually a divalent aromatic residue selected from the group consisting of:

A an unsubstituted or inertly substituted phenylene, unsubstituted or inertly substituted naphthylene;

B.

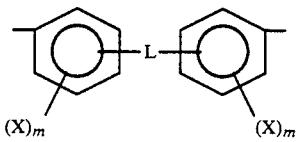

wherein

L is selected from the group consisting of a direct bond, a divalent $C_{1-15}$ hydrocarbyl radical, a divalent $C_{1-8}$ halohydrocarbyl radical, —O—, —CO—, —S—, —SO—, —SO$_2$—, and —SS—, X is individually in each occurrence selected from the group consisting of a hydrogen radical, a monovalent $C_{1-4}$ hydrocarbyl radical, a monovalent $C_{1-4}$ halohydrocarbyl radical, and a halogen, and m is an integer between 1 and 4 inclusive; and C. a divalent bisphenyl fluorenyl or spiro indanyl radical;

R is individually in each occurrence selected from the group consisting of a hydrogen radical, a monovalent $C_{1-4}$ hydrocarbyl radical, a $C_{1-4}$ halohydrocarbyl radical, and a halogen, and q is a positive integer between 1 and 3 inclusive;

s is a positive integer between about 1 and about 250 inclusive;

x is a positive integer between about 0 and about 250 inclusive, and y is a positive integer between about 1 and about 500 inclusive, wherein the ratio of $y/(x+y)$ is between about 0.25 and 1 inclusive: and n is a positive integer representing a degree of polymerization which provides a number-average molecular weight of at least about 4,000.

In the embodiments wherein $Ar_1$ and/or $Ar_2$ comprise an inertly substituted phenylene or naphthylene, the phenolic rings are substituted with inert substituents, that is, substituents which do not substantially interfere with the use of the copolymer in the intended application. In many applications, this means that the inertly substituted sites on the phenolic rings are substantially chemically unreactive. Preferred inert substituents include monovalent $C_{1-8}$ hydrocarbyl radicals, monovalent $C_{1-8}$ hydrocarbyloxy radicals, and halogens. More preferred inert substituents include monovalent $C_{1-4}$ hydrocarbyl radicals, monovalent $C_{1-4}$ hydrocarbyloxy radicals, and halogens. Preferred halogens are fluorine, chlorine, bromine, and iodine; more preferred halogens are fluorine, chlorine, and bromine:

even more preferred halogens are fluorine and chlorine; the most preferred halogen is fluorine.

In the embodiment wherein $Ar_1$ and/or $Ar_2$ comprise

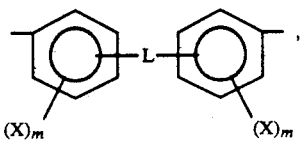

L is preferably a direct bond, a divalent $C_{1-8}$ hydrocarbyl radical, a divalent $C_{1-4}$ halohydrocarbyl radical, —O—, —CO—, —S—, —SO—, —SO$_2$—, or —SS—; L is more preferably a direct bond, a divalent $C_{1-4}$ hydrocarbyl radical, a divalent $C_{1-4}$ halohydrocarbyl radical, —O—, —CO—, —S—, —SO—, —SO$_2$—, or —SS—: L is even more preferably a direct bond, a divalent $C_{1-3}$ hydrocarbyl radical, or a divalent $C_{1-3}$ fluorohydrocarbyl radical: L is most preferably a direct bond or an unsubstituted or fluoro-substituted methylene or isopropylidene radical.

X is preferably a hydrogen radical, a monovalent $C_{1-3}$ hydrocarbyl radical, a monovalent $C_{1-3}$ halohydrocarbyl radical, or a halogen. For X, preferred halohydrocarbyl radicals include fluorohydrocarbyl radicals and preferred halogens include fluorine.

R is preferably a hydrogen radical, a monovalent $C_{1-2}$ hydrocarbyl radical, a monovalent $C_{1-2}$ halohydrocarbyl radical, or a halogen. For R, preferred halohydrocarbyl radicals include chloro-, bromo-, and fluorohydrocarbyl radicals and preferred halogens include chlorine, bromine, and fluorine.

x is preferably a positive integer between about 0 and about 100 inclusive, more preferably a positive integer between about 0 and about 50 inclusive, even more preferably a positive integer between about 0 and about 10 inclusive.

y is preferably a positive integer between about 1 and about 250 inclusive, more preferably a positive integer between about 1 and about 100 inclusive. The ratio of y/(x+y) is preferably between about 0.35 and about 1 inclusive, more preferably between about 0.50 and about 1 inclusive, even more preferably between about 0.75 and about 1 inclusive.

The aryl carbonate cyanoaryl ether copolymers useful in this invention may be prepared by reaction of a solution containing a bisphenolic capped cyanoaryl ether oligomer with phosgene in the presence of a base. Optionally, a solution containing a mixture of the bisphenolic capped cyanoaryl ether oligomer and a second bisphenolic compound may be treated with phosgene in the presence of a base to provide a random aryl carbonate/aryl carbonate cyanoaryl ether copolymer. The bisphenolic capped cyanoaryl ether oligomer preferably possesses a number-average molecular weight of between about 325 and about 6,000. The reaction with phosgene is preferably carried out under an inert atmosphere such as nitrogen. The polymerization reaction is carried out at an appropriate temperature for a period of time for the copolymer to achieve a useful degree of polymerization. Such reaction temperatures are typically subambient, that is, less than about 25° C., so that the reaction proceeds at a controllable rate. The reaction mixture is preferably acidified, for example by adding a dilute solution of hydrochloric acid, the organic layer separated, and the copolymer precipitated in an alcohol such as methanol. The precipitated copolymer is preferably filtered, optionally washed to further purify the product, and dried.

The copolymers so formed possess a number-average molecular weight ($M_n$) such that the copolymers are useful for forming fibers, films, molded articles, foams, coatings, and the like. The number-average molecular weight of such copolymers as measured by gel permeation chromatography is preferably at least about 4,000, more preferably at least about 10,000: the number-average molecular weight of such copolymers is preferably less than about 100,000, more preferably less than about 60,000. The intrinsic viscosity of such copolymers is preferably between about 0.1 and about 1.2 deciliters/gram, more preferably between about 0.2 and about 0.9 deciliters/gram as measured in a dipolar aprotic solvent such as N-methyl-2-pyrrolidinone or dimethylacetamide. The copolymers of this invention are preferably soluble in common dipolar aprotic solvents such as N-methyl-2-pyrrolidinone, dimethylacetamide, dimethylformamide, dimethylsulfoxide, sulfolane, and chlorinated hydrocarbons.

The copolymers useful in this invention preferably possess glass transition temperatures of at least about 100° C., more preferably of at least about 125° C., even more preferably of at least about 150° C. The copolymers preferably possess a tensile strength as measured by ASTM D-1708 of at least about 4,000 psi, more preferably of at least about 5,000 psi. The copolymers preferably possess a tensile modulus as measured by ASTM D-1708 of at least about 100 kpsi, more preferably of at least about 150 kpsi. The copolymers preferably possess an elongation at break as measured by ASTM D-1708 of at least about 2 percent, more preferably of at least about 4 percent.

Such copolymers are used to fabricate the semipermeable membranes of this invention. The membranes of this invention may possess any configuration known to one skilled in the art. In particular, the membranes may be shaped in the form of flat sheets or films, hollow fibers of various cross-sectional shapes, or hollow tubes. Films and hollow fibers of substantially circular cross-section are preferred membrane configurations.

In addition, the membranes of this invention may possess any morphological structure known to one skilled in the art. In particular, the membranes may be a homogeneous membrane, a composite membrane, or an asymmetric membrane. Asymmetric and composite membranes are preferred; asymmetric membranes are more preferred. In the embodiment wherein the membranes possess a hollow fiber configuration, asymmetric membranes may have the discriminating region either on the outside of the hollow fiber, at the inside (lumen) surface of the hollow fiber, or located somewhere internal to both outside and inside hollow fiber membrane surfaces. In the embodiment wherein the discriminating region of the hollow fiber membranes is internal to both hollow fiber membrane surfaces, the inside surface and the outside surface of the hollow fiber membranes are porous, yet the membranes demonstrate the ability to separate gases.

Homogeneous membranes are prepared by forming a thin discriminating layer which is dense and free of voids and pores. Such membranes possess a discriminating layer which generally has substantially the same structure and composition throughout the membrane. In one preferred embodiment, the aryl carbonate cyanoaryl ether copolymers useful in this invention are dissolved in a solvent, thus forming a copolymer/solvent solution which is cast onto a uniform surface from which the membrane may thereafter be readily separated. Preferred casting solvents for the aryl carbonate cyanoaryl ether copolymers of this invention include chlorinated solvents such as methylene chloride and chloroform and dipolar aprotic solvents such as N-methyl-2-pyrrolidinone, N,N-dimethylacetamide, and dimethylformamide. The copolymer/solvent solution should be substantially homogeneous and possess sufficient viscosity to allow casting of the solution onto a uniform surface. Preferably, the solution of copolymer/solvent contains copolymer in weight percents of between about 5 and about 40, more preferably of between about 10 and about 30, even more preferably of between about 10 and about 25.

The solution is cast onto a uniform surface possessing a low surface energy such as silicone or coated glass, or a surface to which the membrane will not adhere such as mercury, or a liquid with which the copolymer is substantially immiscible such as water. Alternately, the membrane may be cast onto a surface which may be dissolved away from the membrane following curing and drying. Casting is performed by pouring the solution onto the appropriate surface and using an appropriate tool to form a film of the appropriate thickness. A continuous casting process may be achieved by casting the solution onto endless belts or rotating drums. Thereafter, the cast solution is exposed to curing or drying conditions. Such conditions are used to substantially remove the solvent, thereby leaving a thin discriminating layer of copolymer which is homogeneous. The solution may be cured or dried either by exposure to a vacuum, exposure to elevated temperatures, by allowing the solvent to evaporate over time, or any combination thereof. Generally, it is preferable to expose the cast solution to elevated temperatures which are below the glass transition temperature of the copolymer, preferably less than about 150° C., more preferably less than about 125° C., even more preferably less than about 100° C.

Composite membranes are prepared by forming a thin discriminating layer of the copolymer on a porous supporting layer. Such membranes possess a discriminating layer which generally has a different structure and composition than the porous supporting layer. To prepare a composite membrane, a homogeneous discriminating layer can be formed and thereafter adhered to a porous supporting layer. Alternatively, the porous supporting layer can be the surface upon which the discriminating layer is cast. In such an embodiment, the composite membrane is prepared by casting a solution as a coating on the porous support. Penetration of the copolymer from which the discriminating layer is formed into the pores of the porous supporting layer is acceptable so long as the desired thickness of the membrane is not exceeded. The porous supporting layer is characterized in that it preferably does not significantly impede the transport of gas through the membrane. In one embodiment, the porous supporting layer can be a metal or polymeric plate with a plurality of holes drilled through it. However, such a drilled plate is not advantageous because it may significantly reduce the effective area of the membrane. In a preferred embodiment, the porous supporting layer is a porous polymeric membrane. Examples of such porous polymeric membranes suitable as porous supporting layers in composite membranes include porous cellulose ester and polysulfone porous membranes commercially available under the tradenames MILLIPORE, PELLICONE, and DIAFLOW. Other preferred porous supporting layers include porous membranes fabricated from polycarbonates, polyestercarbonates, and polyethersulfones. Where such porous supporting membranes are thin or highly deformable, a frame or screen may also be used to adequately support the membrane. In one especially preferred embodiment, the porous polymeric supporting layer is a hollow fiber of a porous polymeric membrane such as a microporous polysulfone membrane. The hollow fiber itself provides adequate support for the discriminating layer coated on the inside or the outside surface of the hollow fiber. After the solution is cast onto the porous supporting layer to form the thin discriminating layer, the membrane is then exposed to curing or drying conditions to substantially remove solvent from the discriminating layer such as described hereinbefore for the formation of homogeneous membranes.

Asymmetric membranes are prepared by forming a thin discriminating layer on a porous supporting layer. Such membranes possess a discriminating layer which generally has the same composition but a different structure than the porous supporting layer. To prepare an asymmetric membrane, a solution of copolymer, solvent, and optional non-solvent is formed and cast as hereinbefore described for homogeneous membranes. Preferred non-solvents for use in this invention include alcohols such as methanol, hydrocarbons such as heptane, and $C_{2-6}$ glycols. The cast solution is partially cured to remove a portion of the solvent and optional non-solvent. Thereafter, one or both surfaces of the partially cured membrane is contacted with a non-solvent for the copolymer such as water so as to form a thin discriminating layer on one or both sides of the membrane while substantially removing the solvent and optional non-solvent from the membrane. The porous supporting layer formed provides support for the thin discriminating layer without significantly impeding the transport of gas through the membrane. The drying step is performed in a manner similar to that described hereinbefore with respect to the formation of homogeneous membranes.

Flat sheet, tubular, and hollow fiber membranes which are homogeneous, composite, or asymmetric may be formed by extrusion from an appropriate solution of the copolymer in a solvent and optional non-solvent. Such extrusion processes are well known to those skilled in the art and the formation of such membranes requires the adaptation of the hereinbefore described techniques.

Extrusion is the preferred process for the fabrication of flat sheet, tubular, or hollow fiber membranes. In the case of extrusion, the components of the extrusion mixture may be combined prior to extrusion by mixing in any convenient manner with conventional mixing equipment, as for example, in a Hobart mixer. Alternately, the extrusion mixture may be homogenized by extruding the mixture through a twin screw extruder, cooling the extrudate, and grinding or pelletizing the extrudate to a particle size readily fed to a single or twin screw extruder. The components of the extrusion mixture may also be combined directly in a melt-pot or twin screw extruder and extruded into membranes in a single step.

The copolymer, solvent, and optional non-solvent mixture is heated to a temperature at which the mixture becomes a homogeneous fluid. The homogeneous fluid is then extruded through a sheet, hollow tube, or hollow fiber die (spinnerette). Hollow fiber spinnerettes are typically multi-holed and thus produce a tow of multiple hollow fibers. The hollow fiber spinnerettes include a means for supplying fluid to the core of the extrudate. The core fluid is used to prevent collapse of the hollow fibers as they exit the spinnerette. The core fluid may be a gas such as nitrogen, air, carbon dioxide, or other inert gas, or a liquid which is a non-solvent for the copolymer such as water. Following extrusion, the membrane is treated as hereinbefore described for homogeneous, composite, or asymmetric membranes.

In one preferred embodiment, the membranes are annealed and/or cross-linked before use. The membrane is preferably exposed to temperatures above about 100° C. and below about 250° C. for a period of time to partially densify and/or cross-link the copolymer. This procedure may optionally be performed under vacuum.

The copolymers used to fabricate the membranes of this invention may be cross-linked by reaction with a polyepoxide compound in the presence of an initiator/catalyst for the reaction of aromatic carbonate linkages with epoxy groups. Examples of suitable initiators/catalysts include tetraorgano phosphonium salts and hexaorgano phosphoranylidene ammonium (phosphine iminium) salts. The stoichiometric ratio for the cross-linking reaction is one aromatic carbonate linkage to two epoxide groups (oxirane rings). The cross-linking reaction is preferably conducted at elevated temperatures, preferably above about 100° C., more preferably above about 125° C. The cross-linking reaction is preferably carried out at temperatures below about 250° C. The cross-link density in the final cross-linked copolymer may be controlled by the distance between aromatic carbonate linkages in the aryl carbonate cyanoaryl ether copolymer and the amount of polyepoxide compound, up to the stoichiometric amount, reacted with the aryl carbonate cyanoaryl ether. Examples of suitable polyepoxide compounds include diglycidyl ethers of bisphenol A, polyglycidyl ethers of phenol-formaldehyde, cresol-formaldehyde novolacs, and hydrocarbon polyepoxides, such as the diepoxide of vinyl cyclohexene. The cross-linked copolymer exhibits increased solvent resistance, increased temperature resistance, and decreased elongation at break compared to the uncross-linked copolymer. For further information regarding the cross-linking reaction, see Parker, U.S. Pat. Application Ser. No. 07/405,992, filed Sept. 11, 1989, the relevant portions incorporated herein by reference for all legal purposes which may be served thereby.

Preferably, the homogeneous membranes useful in this invention have a thickness of between about 5 and about 500 microns, more preferably between about 10 and about 150 microns. Hollow fiber homogeneous membranes preferably have an outer diameter of between about 50 and about 800 microns, more preferably between about 100 and about 300 microns. Preferably, the discriminating layer in composite or asymmetric membranes possesses a thickness of between about 0.02 and about 10 microns, more preferably between about 0.02 and about 2 microns. Preferably, the supporting layer in composite or asymmetric membranes possesses a thickness of between about 5 and about 500 microns, more preferably between about 10 and about 150 microns. Hollow fiber composite or asymmetric membranes preferably have an outer diameter in the range of from about 50 to about 800 microns, more preferably in the range of from about 100 to about 300 microns.

The membranes are fabricated into flat sheet, spiral wound, tubular, or hollow fiber devices by methods known in the art. See U.S. Pat. Nos. 3,228,876; 3,422,008: 3,455,460; 3,475,331; 3,526,001; 3,528,553; 3,690,465: 3,702,658; 3,755,034; 3,801,401: 4,271,900; 3,872,014; 3,966,616; 4,045,851; 4,061,574; 4,080,296: 4,083,780: 4,220,535: 4,235,723; 4,265,763; 4,315,819; 4,430,219; 4,351,092; 4,367,139; 4,666,469; 4,707,267; 4,752,305; 4,758,341; 4,871,379; and 4,929,259; the relevant portions of each patent incorporated herein by reference for all legal purposes which may be served thereby.

The membranes are sealingly mounted in a pressure vessel in such a manner that the membrane separates the vessel into two fluid regions wherein fluid flow between the two regions is accomplished by fluid permeating through the membrane. Under certain conditions, it may be highly desirable to provide support for the membrane when the membrane is employed in a separation apparatus or process. In one embodiment, the peripheral area of the membrane is affixed to a framing structure which supports the outer edge of the membrane. The membrane can be affixed to the framing structure by a clamping mechanism, adhesive, chemical bonding, or other techniques known in the art. The membrane affixed to the frame can then be sealingly engaged in the conventional manner in a vessel so that the membrane surface inside the framing support separates two otherwise non-communicating regions in the vessel. One skilled in the art will recognize that the structure which supports the membrane can be an internal part of the vessel or even the outer edge of the membrane.

The membrane divides the separation chamber into two regions, a high pressure side into which the feed gas mixture is introduced and a lower pressure side. One side of the membrane is contacted with a feed gas mixture under pressure, while a pressure differential is maintained across the membrane. In the embodiment wherein the membrane is in hollow fiber form, the feed gas mixture may be introduced on the outside or the inside of the hollow fiber. At least one gaseous component in the gas mixture selectively permeates through the membrane more rapidly than the other gaseous component(s) in the gas mixture. Gas which is enriched in the selectively permeating gaseous component(s) is thus obtained on the low pressure side of the membrane which is removed from the low pressure side of the membrane as permeate. Gas depleted in the selectively permeating gaseous component(s) is obtained on the high pressure side of the membrane which is removed from the high pressure side of the membrane as non-permeate.

Gas permeability is defined as
$$P = \frac{(\text{amount of permeant})(\text{membrane thickness})}{(\text{area})(\text{time})(\text{driving force across the membrane})}.$$

A standard permeability measurement unit is the Barrer (Ba), which is equal to $$10^{-10} \frac{(\text{centimeter})^3(\text{STP})(\text{centimeter})}{(\text{centimeter})^2(\text{second})(\text{centimeter Hg})},$$

abbreviated hereinafter as $$10^{-10} \frac{\text{cm}^3(\text{STP})\text{cm}}{\text{cm}^2 s \text{cmHg}}.$$

The reduced gas flux is defined as (permeability)÷(membrane thickness). A standard reduced flux unit is $$10^{-6} \frac{(\text{centimeter})^3(\text{STP})}{(\text{centimeter})^2(\text{second})(\text{centimeter Hg})},$$

abbreviated hereinafter as $$10^{-6} \frac{\text{cm}^3(\text{STP})}{\text{cm}^2 s \text{cmHg}}.$$

The gas separation factor (selectivity) is defined as the ratio of the permeability or flux of the faster permeating gas to the permeability or flux of the slower permeating gas.

The membranes of this invention are particularly useful for separating gas mixtures containing at least one gas selected from the group consisting of hydrogen, helium, oxygen, nitrogen, carbon monoxide, carbon dioxide, water vapor, hydrogen sulfide, ammonia, and light hydrocarbons. As used herein, the term light hydrocarbons refers to gaseous saturated and unsaturated $C_{1-4}$ hydrocarbons such as methane, ethane, ethylene, propane, propylene, butane, and butylene.

The uncross-linked or cross-linked membranes of this invention preferably possess a separation factor at about 30° C., for helium/methane of at least about 35, more preferably of at least about 50. The uncross-linked or cross-linked membranes of this invention preferably possess a separation factor at about 30° C. for helium/ethane of at least about 75, more preferably of at least about 100. The uncross-linked or cross-linked membranes of this invention preferably possess a separation factor for helium/ethylene at about 30° C. of at least about 25, more preferably of at least about 40. The uncross-linked or cross-linked membranes of this invention preferably possess a permeability for helium of at least about 9 Barrers, more preferably of at least about 11 Barrers. In the embodiment wherein the membranes are cross-linked, the membranes preferably exhibit a separation factor at about 30° C. for helium/methane of at least about 80, for helium/ethane of at least about 250, and for helium/ethylene of at least about 35.

The uncross-linked or cross-linked membranes of this invention preferably possess a separation factor for oxygen/nitrogen at about 30° C. of at least about 4.5, more preferably of at least about 5.0, even more preferably of at least about 6.0. The uncross-linked or cross-linked membranes of this invention preferably possess an oxygen permeability of at least about 0.5 Barrers, more preferably of at least about 1.0 Barrer.

The separation process is carried out at pressures and temperatures which do not deleteriously affect the membrane. Preferably, the pressure on the high pressure side of the membrane is between about 10 psig and about 1000 psig, more preferably between about 50 psig and about 500 psig. The temperature of the feed gas mixture is preferably between about 0° C. and about 150° C., more preferably between about 5° C. and about 100° C.

The membrane separation process of this invention may be combined with non-membrane separation processes such as cryogenics and pressure swing adsorption.

SPECIFIC EMBODIMENTS

The following Examples are included to illustrate the invention and are not intended to limit the scope of the invention or claims.

EXAMPLE 1

Preparation Of Bis Phenolic Cyanoaryl Ether Copolymer From 1200 Molecular Weight Oligomer A copolymer of Formula I wherein $Ar_2$ is a divalent bisphenol A aromatic residue, R is a hydrogen radical, q is 3, y is 1, x is 0, and s is 3 was synthesized using the following procedure.

A round bottomed flask equipped with a mechanical stirrer, Dean-Stark apparatus, condenser, controller probe, and gas inlet and outlet was charged with about 80 milliliters of N-methyl-2-pyrrolidinone, about 65 milliliters of toluene, about 18.24 grams para-bisphenol A (2,2-bis(4-hydroxyphenyl)propane), and about 22.63 grams potassium carbonate. The flask was slowly purged with nitrogen during the polymerization. The reaction mixture was heated and the water removed azeotropically at about 150° C. over a period of about 1 and ¾ hours. The toluene was then distilled out at about 160° C. and removed from the flask. About 8.34 grams 2,6-difluorobenzonitrile was added to the flask which was then heated at about 160° C. for about 16 hours. The reaction mixture was then cooled, diluted with tetrahydrofuran, neutralized with acetic acid, and filtered through a glass frit. The oligomer was precipitated by pouring the filtrate into water. The precipitate was collected by filtration, washed with water, and dried under vacuum, yielding about 22.5 grams of oligomer with a calculated theoretical molecular weight of about 1200.

A round bottomed flask equipped with a mechanical stirrer and nitrogen purge was charged with about 6.05 grams of the 1200 molecular weight oligomer previously prepared, solubilized in about 20 milliliters of methylene chloride and about 1.05 milliliters of pyridine. The resulting solution was immersed in an ice bath and cooled for about 10 minutes. Phosgenation of the oligomer was accomplished by adding a solution of phosgene in methylene chloride. Sufficient phosgene was added to bring about a noticeable increase in the solution viscosity. The copolymer was post-capped with methanol subsequent to a positive chloroformate calorimetric test with a small aliquot of 4-(p-nitrobenzylpyridene) and tetrahydrofuran. The organic layer was separated and the copolymer precipitated by addition of methanol. About 5.65 grams of copolymer were obtained, which exhibited an inherent viscosity of about 0.745 deciliters/gram in methylene chloride at about 25° C. at a concentration of about 0.5 grams/deciliter.

The glass transition of the copolymer was determined to be about 173° C. as measured by Differential Scanning Calorimetry (DSC), using a duPont 1090 apparatus scanning at a rate of about 10° C./minute. The copolymer exhibited a tensile strength of about 11,300 psi, a tensile modulus of about 356 kpsi, and an elongation at break of about 15.8 percent as measured by ASTM D-1708.

EXAMPLE 2

Preparation Of Bis Phenolic Cyanoaryl Ether Copolymer From 3200 Molecular Weight Oligomer A copolymer of Formula I wherein $Ar_2$ is a divalent bisphenol A aromatic residue, R is a hydrogen radical, q is 3, y is 1, x is 0, and s is 9 was synthesized by the following procedure.

The apparatus and general procedure of Example 1 was used to prepare about a 3200 molecular weight oligomer (calculated theoretical value) from about 100 milliliters of N-methyl-2-pyrrolidinone, about 75 milliliters of toluene, about 22.80 grams para-bisphenol A (2,2-bis(4-hydroxyphenyl)propane), about 12.51 grams of 2,6-difluorobenzonitrile, and about 28.29 grams of potassium carbonate. About 28.4 grams of oligomer were obtained.

The apparatus and general procedure of Example 1 were used to polymerize the oligomer, using about 15.86 grams of the 3200 molecular weight oligomer previously prepared, yielding about 15.9 grams of copolymer.

The glass transition of the copolymer was determined to be about 175° C. as measured by Differential Scanning Calorimetry (DSC), using a duPont 1090 apparatus scanning at a rate of about 10° C./minute. The copolymer exhibited a tensile strength of about 13,100 psi, a tensile modulus of about 428 kpsi, and an elongation at break of about 33.2 percent as measured by ASTM D-1708.

EXAMPLE 3

Preparation Of Membranes

The copolymers of Examples 1 and 2 were used to prepare membranes therefrom. Uncross-linked films from the copolymers of Examples 1 and 2 were obtained by casting about 20 weight percent copolymer solutions onto glass plates, which were then heated at about 70° C. for about 30 minutes to substantially remove residual solvent from the films. The films were displaced from the glass with water and air dried.

Film samples of cross-linked membranes were obtained by reaction of the aryl carbonate linkages in the copolymers of Examples 1 and 2 with a polyepoxide compound in the presence of an initiator. The copolymer of Example 1, about 0.0799 grams, was mixed with DER ® 332 epoxy resin (a diglycidyl ether of bisphenol A, ® trademark of The Dow Chemical Company), about 0.0202 grams, by dissolving the copolymer and resin in methylene chloride. The initiator bis(triphenyl phosphoranylidene) ammonium chloride, was dissolved in methylene chloride to give about a 1 percent by weight solution. A portion of this solution was added to the copolymer/epoxy resin mixture; using a concentration of initiator of 0.0015 mmol (millimoles)/gram. The solution containing copolymer, epoxy resin, and initiator was cast as described for the uncross-linked films. The dried film was placed on a metal sheet and the cross-linking reaction effected by heating the film at about 200° C. for about 2 hours. The cross-linked membrane from the copolymer of Example 2 was prepared by dissolving about 0.1025 grams of the copolymer prepared in Example 2 and about 0.0101 grams of DER ® 332 epoxy resin in methylene chloride. The initiator bis(triphenylphosphoranylidene) ammonium chloride solution was dissolved in methylene chloride to give about a 1 percent by weight solution. The initiator solution was added to the copolymer/epoxy resin, using a concentration of initiator of about 0.0015 mmol/gram. The film was cast as described for the uncross-linked films; the film was then cross-linked at about 200° C. for about 2 hours.

The gas permeabilities of helium, methane, ethane, ethylene, oxygen, and nitrogen were measured on about 3.8 centimeter diameter film samples at a temperature of about 30° C. using the constant-volume, variable-pressure method. Gas selectivities for helium/methane, helium/ethane, helium/ethylene, and oxygen/nitrogen were computed from the corresponding single gas permeabilities. Data for the uncross-linked and cross-linked membranes are reported in Table I.

TABLE I

| Polymer | Permeability (Barrers) | | Selectivity | | | |
| --- | --- | --- | --- | --- | --- | --- |
| | Helium | Oxygen | $He/CH_4$ | $He/C_2H_4$ | $He/C_2H_6$ | $O_2/N_2$ |
| Example 1 | | | | | | |
| uncross-linked | 11.7 | 1.3 | 40 | 29 | 82 | 5.6 |
| cross-linked | 9.3 | 0.68 | 91 | 92 | 331 | 4.8 |
| Example 2 | | | | | | |
| uncross-linked | 12.0 | 1.2 | 53 | 44 | 105 | 6.4 |
| cross-linked | 9.8 | 0.68 | 86 | 36 | 298 | 5.2 |

What is claimed is:

1. A semi-permeable gas separation membrane comprising a thin discriminating layer of an uncross-linked or cross-linked aryl carbonate cyanoaryl ether copolymer possessing a polymer backbone structure corresponding to the formula:

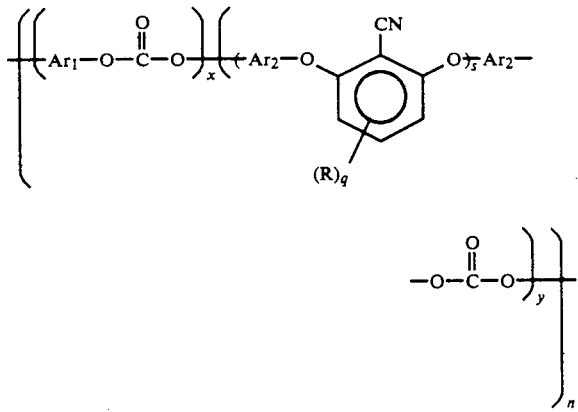

wherein $Ar_1$ and $Ar_2$ are each individually a divalent aromatic residue selected from the group consisting of:
   A. an unsubstituted or inertly substituted phenylene, unsubstituted or inertly substituted naphthylene;
   B.

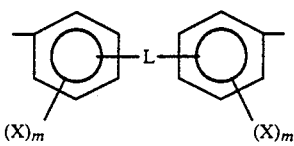

wherein
- L is selected from the group consisting of a direct bond, a divalent $C_{1-15}$ hydrocarbyl radical, a divalent $C_{1-8}$ halohydrocarbyl radical, —O—, —CO—, —S—, —SO—, —SO$_2$—, and —SS—,
- X is individually in each occurrence selected from the group consisting of a hydrogen radical, a monovalent $C_{1-4}$ hydrocarbyl radical, a $C_{1-4}$ halohydrocarbyl radical, and a halogen, and
- m is an integer between 1 and 4 inclusive; and C. a divalent bisphenyl fluorenyl or spiro indanyl radical;
- R is individually in each occurrence selected from the group consisting of a hydrogen radical, a monovalent $C_{1-4}$ hydrocarbyl radical, a $C_{1-4}$ halohydrocarbyl radical, and a halogen, and
- q is a positive integer between 1 and 3 inclusive;
- s is a positive integer between about 1 and about 250 inclusive
- x is a positive integer between about 0 and about 250 inclusive, and
- y is a positive integer between about 1 and about 500 inclusive, wherein
the ratio of y/(x+y) is between about 0.25 and 1 inclusive: and
n is a positive integer representing a degree of polymerization which provides a number-average molecular weight of at least about 4,000.

2. The membrane of claim 1 wherein Ar$_1$ and/or Ar$_2$ comprise an inertly substituted phenylene or naphthylene, wherein the inert substituents are selected from the group consisting of a monovalent $C_{1-8}$ hydrocarbyl radical, a monovalent $C_{1-8}$ hydrocarbyloxy radical, and a halogen.

3. The membrane of claim 2 wherein the inert substituents are selected from the group consisting of a monovalent $C_{1-4}$ hydrocarbyl radical, a monovalent $C_{1-4}$ hydrocarbyloxy radical, and a halogen.

4. The membrane of claim 3 wherein the inert substituents comprise a halogen selected from the group consisting of fluorine, chlorine, and bromine.

5. The membrane of claim 1 wherein Ar$_1$ and/or Ar$_2$ comprise

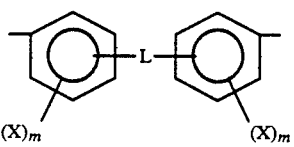

wherein
L is selected from the group consisting of a direct bond, a divalent $C_{1-8}$ hydrocarbyl radical, a divalent $C_{1-4}$ halohydrocarbyl radical, —O—, —CO—, —S—, —SO—, —SO$_2$—, and —SS—.

6. The membrane of claim 5 wherein L is selected from the group consisting of a direct bond, a divalent $C_{1-4}$ hydrocarbyl radical, a divalent $C_{1-4}$ halohydrocarbyl radical, —O—, —CO—, —S—, —SO—, —SO$_2$—, and —SS—.

7. The membrane of claim 6 wherein L is selected from the group consisting of a direct bond, a divalent $C_{1-3}$ hydrocarbyl radical, and a divalent $C_{1-3}$ fluorohydrocarbyl radical.

8. The membrane of claim 7 wherein L is selected from the group consisting of a direct bond, an unsubstituted or fluoro-substituted methylene radical, and an unsubstituted or fluoro-substituted isopropylidene radical.

9. The membrane of claim 1 wherein Ar$_1$ and/or Ar$_2$ comprise

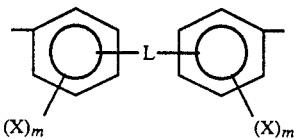

wherein
X is selected from the group consisting of a hydrogen radical, a monovalent $C_{1-3}$ hydrocarbyl radical, a monovalent $C_{1-3}$ halohydrocarbyl radical, and a halogen.

10. The membrane of claim 9 wherein X is selected from the group consisting of a fluorohydrocarbyl radical and fluorine.

11. The membrane of claim 1 wherein the membrane is composite or asymmetric.

12. The membrane of claim 1 wherein the membrane is a hollow fiber.

13. The membrane of claim 1 wherein the separation factor for helium/methane at about 30° C. is at least about 35.

14. The membrane of claim 1 wherein the separation factor for helium/ethane at about 30° C. is at least about 75.

15. The membrane of claim 1 wherein the separation factor for helium/ethylene at about 30° C. is at least about 25.

16. The membrane of claim 1 wherein the permeability for helium is at least about 9 Barrers.

17. The membrane of claim 1 wherein the separation factor for oxygen/nitrogen at about 30° C. is at least about 4.5.

18. The membrane of claim 1 wherein the permeability for oxygen is at least about 0.5 Barrers.

19. The membrane of claim 1 wherein the copolymer is cross-linked by reaction with a polyepoxide compound.

20. The membrane of claim 19 wherein the separation factor for helium/methane at about 30° C. is at least about 80.

21. The membrane of claim 19 wherein the separation factor for helium/ethane at about 30° C. is at least about 250.

22. The membrane of claim 19 wherein the separation factor for helium/ethylene at about 30° C. is at least about 35.

* * * * *